United States Patent [19]

Horowitz et al.

[11] 3,940,377

[45] Feb. 24, 1976

[54] METHOD OF ACTIVATING POLYMERS

[75] Inventors: Carl Horowitz; Leon Pinczuk; Michael Dichter, all of Brooklyn, N.Y.

[73] Assignee: Polymer Research Corporation of America, Brooklyn, N.Y.

[22] Filed: June 19, 1972

[21] Appl. No.: 264,020

Related U.S. Application Data

[62] Division of Ser. No. 105,670, Jan. 11, 1971, abandoned.

[52] U.S. Cl. ... 260/79.5 NV; 260/92.8 A; 260/93.7; 260/94.9 GD; 260/878 R
[51] Int. Cl.² .................. C08F 8/42; C08F 8/36
[58] Field of Search ... 260/94.9 GD, 93.7, 79.5 NV, 260/92.8 A

[56] References Cited
UNITED STATES PATENTS

| | | | |
|---|---|---|---|
| 2,212,786 | 8/1940 | McQueen | 260/94.9 GD |
| 3,050,503 | 8/1962 | Natta et al. | 260/94.9 GD |
| 3,401,049 | 9/1968 | Horowitz | 117/47 A |
| 3,642,728 | 2/1972 | Canter | 260/79.5 NV |
| 3,740,258 | 6/1973 | Walles | 260/79.5 NV |

Primary Examiner—Alan Holler
Attorney, Agent, or Firm—Steinberg & Blake

[57] ABSTRACT

The invention relates to the activation of polymers and more particularly to certain classes of high polymeric material which are not susceptible to dyeing or the like whereby the polymeric material is given a functional group which can react with dyes, monomeric materials, etc. Polymeric materials such as polyolefins, e.g. polypropylene, polyesters and polyvinylchloride are sulfonated by reaction with a sulfonating agent in the presence of a hydrocarbon and/or a chlorinated hydrocarbon. The resulting sulfonated polymer can then be easily dyed or can be reacted with monomers to obtain dyeable polymers.

8 Claims, No Drawings

METHOD OF ACTIVATING POLYMERS

CROSS-REFERENCE TO RELATED APPLICATION

This is a divisional of our copending application Ser. No. 105,670, filed Jan. 11, 1971 for "Activation of Polymers", now abandoned.

BACKGROUND OF THE INVENTION

It is well known that different classes of high polymeric material are not susceptible to dyeing by one or more types of dyes, are weakly adherent, that is they do not possess the property of affecting a bond between solid surfaces and they have a weak sealability. This is due to the fact that the polymer lacks functional groups which are also known as dye or adhesive receptors with which the dye molecules or adhesive molecules may combine. The best type of combination or dye molecules or adhesive molecules would be by grafting, but till now there was no industrially satisfactory manner of accomplishing this.

Among this group of high polymeric materials are the polyolefins, particularly polypropylene, the polyesters and polyvinylchloride.

In the case of polypropylene it is well known that such polymer, particularly the polypropylene which is partially or completely crystalline, can be melt spun into synthetic fibers having unusual physical properties. However, this polymer is subject to the above-mentioned inherent disabilities which greatly restrict its utility, particularly in the fabrication of general purpose fibers and films.

While polyesters such as the polyethylene terephthalates and also polyvinylchloride can be more easily dyed than polypropylene, nevertheless, only limited types of dyes can be used and the color fastness is not always satisfactory.

SUMMARY OF THE INVENTION

Generally speaking, in accordance with the invention a polypropylene, polyester of polyvinylchloride is sulfonated thus changing the non polar structure thereof to a polar structure and the sulfonated polymer can then be further reacted for dyeing, adhesion purposes, attachment of monomeric groups by grafting, etc. The sulfonating of the polymer is accomplished in accordance with the invention in contact with a solvent such as a hydrocarbon, preferably a chlorinated hydrocarbon.

It is accordingly a primary object of the present invention to provide a method by which polyolefins, polyesters and polyvinylchloride can have functional groups grafted thereto so as to permit dyeing and improve the adhesion and sealability without changing the basic properties of the polymer.

It is a further object of the present invention to improve certain of the properties of polymers such as polypropylene, polyesters and polyvinylchloride by the grafting of reactive groups, functional polar monomers with a positive or negative charge, or monomers to the polymeric molecule.

It is yet another object of the present invention to provide a method of attaching $SO_3$ groups to polymers such as polypropylene, polyesters and polyvinylchloride (i.e., to sulfonate polymer) which $SO_3$ group is able to react with monomers or other chemical compounds to form grafts which become attached to the polymeric molecule. Thus, the invention provides for the formation of the sulfonated form of the polymers which can be grafted or which can react with different monomers or other groups in order to obtain dyeable polymers or polymers with an improved adhesion, sealability and many other properties.

With the above and other objects in view, the present invention mainly comprises the reaction of a polymer with a sulfonating agent in the presence of a chlorinated hydrocarbon. Thus, it is an important feature of the present invention that the reaction between the sulfonating agent and the polymer take place in the presence of a hydrocarbon and/or a chlorinated hydrocarbon, particularly by dissolving the sulfonating agent in the solvent, e.g., the hydrocarbon and chlorinated hydrocarbon, since it has been found that without the suitable solvent, most preferably the chlorinated hydrocarbon the reaction proceeds in a nonuniform very sluggish manner, particularly when the grafted substance is a solid. Apparently the chlorinated hydrocarbon penetrates into the polymer and greatly increases the reaction surface and therefore the speed of reaction.

In some cases, instead of dissolving the sulfonating agent in the chlorinated hydrocarbon it may be advantageous to dip the polymer in the chlorinated hydrocarbon and then to contact it with the sulfonating agent either as such or dissolved in a chlorinated hydrocarbon.

According to a further embodiment of the present invention it is possible to pretreat any of the above polymeric materials in order to activate the polymer for the sulfonation treatment. As a matter of fact, the pretreatment, which will be described below, not only activates the polymeric material for sulfonation, but actually activates the polymeric material to such extent that any strong anion or cation can be easily grafted onto the polymeric material.

This pretreatment method comprises the treatment of polymeric material with a solution of a soluble silver salt followed by treatment with a strong base such as sodium hydroxide which causes colloidal silver and/or silver oxide to precipitate onto the polymeric material. The thus-treated polymeric material can then be subsequently treated with any strong acid or strong base to cause the grafting of the corresponding ion onto the polymeric material which then can be easily dyed or otherwise treated. The strong acid or strong base actually acts as an ionic graft initiator for the grafting of monomeric material and/or dyes onto the polymer.

All commonly usable sulfonating agents may be used for the method of the present invention, for example sulfuric acid, chlorosulfonic acid, sulfurous acid, sulfur dioxide, sulfur trioxide, fuming sulfuric acid, sulfuryl chloride and pyrosulfuryl chloride. Among the suitable chlorinated hydrocarbons which may be utilized as the medium for carrying out the sulfonating reaction are: ethylene dichloride, methylene dichloride, triethylene chloride, carbon tetrachloride, methyl chloride, chlorobenzene, dichlorobenzene, etc.

The sulfonation reaction proceed extremely rapidly even at room temperature, so that it is unnecessary to set forth special condition for the sulfonation.

The sulfonated polymer can be very easily dyed with the dye after being grafted with the monomer by cationic grafting. Thus a strong acid group is attached to the molecule of the polymer rendering the entire molecule strongly acidic. When a monomer is brought into contact with such strongly acid polymer instantaneous polymerization takes place and the formed new polymer becomes strongly attached to the substrate and cannot be removed by leaching with solvent, thus proving that a chemical bonding or grafting takes place.

Among the monomers that may be reacted with the thus treated polymer are the following:

Ethyleneimine, hydroxyethyl methacrylate, dimethylaminoethyl methacrylate, product of quaternization of 1-chloro 2-hydroxy propyl methacrylate and trimethyl amine, 2-vinyl pyridine, 2-ethyl vinyl pyridine, 2-methyl 5- vinyl pyridine, ethyl acrylate, butyl acrylate, acrylonitrile, ethyl fumarate, 2-isopropenyl pyridine, vinyl chloride, vinyl pyrrolidene, N- methylol methacrylamide, acrylic acid, N- isopropyl acrylamide, vinylidene chloride, vinylidene bromide, vinyl bromide, hydroxypropyl methacrylate and ethyl hexylacrylate.

Methyl Methacrylate and its derivatives (also oleyl, n - decyl, octadecyl, cyclohexyl, n - butyl, amyl, cetyl acrylates and others), acrylic acid and its derivatives (also butyl, amyl, octyl hexadecryl, etc.), methylacrylate and its derivatives, methacrylic acid and its derivatives, vinyl acetate, vinyl chloride, vinylidene chloride, isobutylene vinyl ethers, acrylonitrile, maleic acid and its esters, crotonic acid and esters, itoconic acid and its esters, allylic esters, allyl vinyl esters vinylpyridine and its derivatives (also 2-methyl-5-vinyl pyridine), chloroprene, isoprene, dimethylaminoethylmethacrylate, styrene, 1,3-butylene dimethacrylate, isooctyl vinyl ether, acrylamide, glycidyl methacrylate, N-vinyl caprolactam, N-vinyl pyrrolidone, N-vinyl carbazole, sodium styrene sulfonate, sodium vinyl sulfonate, bis (beta-chloroethyl) vinyl phosphonate, cetyl vinyl ether, divinyl ether of ethylene glycol, divinyl ether of butanediol, vinyl toluene, vinyl acetate, octadecyl vinylether. Also mixtures of 2 or more monomers can be used. The monomeric tertiary amines can be quaternized with benzyl chloride, ethyl iodide, methyl or ethylsulfate. Conversely, monomeric chlorides can be quaterized with tertiary amines to give quaternary ammonium compounds. Some suitable tertiary amines are: N-ethyl morpholine, pyridine, cetyldimethyl pyridine, dimethyl aniline, etc., mono,-di tri-, tetra-and poly-ethylene glycol-dimethacrylate, methylvinylpyridine, allylcralate and methacrylate, allylchloride, allylacohol, perfluoro alkylacrylates and methacrylates, p-amino-styrene, vinyl bromide and vinylidene bromide trimethylvinylbenzylammonium chloride, vinyltrifluoroacetate (followed by hydrolysis to poly-vinyl alcohol), diallyl chloromethyl phosphonate, diallyl benzene phosphonate, diallyl dimethyl ammonium chloride, diallyl ethylene glycol,-diethyleneglycol - and polyethylene glycol acrylates and methacrylates, vinyl perfluoro octaneate, can also be treated in accordance with the method of this invention.

DESCRIPTION OF PREFERRED EMBODIMENTS

The following examples are given to further illustrate the invention. The scope of the invention is not, however, meant to be limited to the specific details of the examples.

EXAMPLE 1

A polypropylene film (Hercules B- 500 not treated) is immersed for 1 second at room temperature in a cylinder which contains the following solution:
  200 g Sulfan (sulfur trioxide product of Allied Chemical Company)
  800 g Ethylene chloride After 1 second the film is taken out and washed with water and dried in an oven at a temperature of 200°F. After that it is dyed with a basic dye Astrazon Blue B (product of Verona Dyestuffs). There is obtained a deep shade of blue which is washfast.

Another sample of this film treated with the above-mentioned solution was checked by the drop angle test and a 50° incline as compared with the 23° for the control (not treated film B-500 is obtained.

EXAMPLE 2

A polypropylene film (Herclues B- 500 not treated) is immersed for 1 second at room temperature in a cylinder which contains the following solution:
  450 Chlorosulfonic acid
  550 Ethylene dichloride After 1 second the film is taken out, washed with water and dried in an oven at a temperature of 200°F and dyed with basic dye Astrazon Blue B (Verona Dyestuffs). A deep washfast shade of blue is obtained. Another sample was checked by the drop angle test and a 50° incline as compared with the 23° for the control (not treated film B- 500) is obtained.

EXAMPLE 3

A polypropylene film (Hercules B- 500 not treated) is immersed for 1 second at room temperature in a cylinder which contains fuming sulfuric acid (30% $SO_3$). After 1 second the film is taken out, washed with water and dried in an oven at 200°F and dyed with basic dye Astrazon Blue-B (Verona Dyestuffs). A deep washfast shade of blue is obtained. Another sample was checked by the drop angle test and a 90° incline as compared with the 23° for the control (not treated film B- 500 is obtained.

EXAMPLE 4

50g polypropylene powder (Profax 6601 Hercules, Inc.) are placed in a cylinder with a net bottom and immersed for 1 second at room temperature in a second cylinder which contains:
  200 g Sulfan
  800 g Ethylene dichloride After 1 second it is taken out and immersed in water, dried in an oven at 200°F and dyed with basic dye (Astrazon Blue). A deep shade of blue which does not come out in washing is obtained.

EXAMPLE 5

50 g of polypropylene powder (Profax 6601, Hercules, Inc.) like in Example 4 is immersed for 1 second at room temperature in ethylene dichloride, then taken out and immersed in fuming sulfuric acid (30% $SO_3$) and after that it is washed with water and dried in an oven at 200°F. The dried powder is dyed withh basic dye (Astrazon Blue B) and a deep shade of blue is obtained which is washfast.

EXAMPLE 6

A polypropylene film (Hercules B- 00) is immersed for 1 second in the following solution No. 1:
  200 g Sulfan
  800 g Ethylene dichloride After that it is taken out and immersed in the following solutions (for 1 second) each
  Solution No. 2: water
  Solution No. 3: 0.1% solution of silver nitrate
  Solution No. 4 0.5% Potassium hydroxide Solution No. 5 30 cc ethylene imine and 200 cc isopropyl alcohol + 10 cc HCl + 40 cc water. (A solution of HCl and water is added at the time the film is immersed.)

Solution No. 6 water

This film is dried in an oven at 200°F and dyed with acid dye "Pentacyl" Fast Blue 5R (DuPont). A deep shade of blue is obtained.

Another sample was checked by the drop angle test and a 55° incline as compared with the 23° for the control (not treated film) was obtained.

EXAMPLE 7

A polypropylene film B- 500 is treated as in Example 6 with the difference that instead of the solution No. 5 the following solution is used:

10 g product of quaternization of dimethylaminoethyl methacrylate and dimethyl sulfate
3 g Ammonium Persulfate
2 g Sodium m- bisulfate
10 cc water
100 g Methanol A film dyeable with acid dye "Pontacyl" Blue -5R (DuPont) and which is resistant to washing is obtained.

EXAMPLE 8

A polypropylene film (Hercules B-500 not treated) is immersed for 1 second at room temperature in a cylinder containing fuming sulfuric acid (30% $SO_3$). After that it is taken out and immersed in the following solutions:

Solution No. 1 toluene
Solution No. 2 30% Styrene + 70% toluene
Solution No. 3 water
Solution No. 4 toluene
Solution No. 5 water A styrene graft on polypropylene (cationic grafting) is obtained. It was checked by the drop angle test and a 90° incline as compared with the 23° for the control was obtained.

EXAMPLE 9

Polypropylene fiber (Thiokol Comp) is immersed for 1 second at room temperature in a cylinder which contains the following solution:

200 g Sulfan
800 g Ethylene dichloride

After 1 second it is taken out and washed with water and dried in an oven at a temperature of 200°F. After that it is dyed with a basic dye Astrazon Blue B (Verona Dyestuffs). A deep shade of blue which is washfast is obtained.

EXAMPLE 10

Polypropylene fiber (Thiokol Corp.) is treated as in Example 6. After that it is dyed with acid dye "Pentracyl" fast Blue 5R (DuPont). A deep shade of blue which is washfast is obtained.

Although the invention is particularly advantageous in connection with the treatment of polypropylene, polyesters and polyvinylchloride in order to make these relatively non-reactable polymeric materials easily dyeable and alike, it is to be understood that the method can be carried out on all synthetic polymers, natural polymers, inorganic polymers and metals.

Examples of synthetic polymers are:

Banlon, nylon, Dynel polyvinyl copolymer, polypropylene, polyethylene, polyolefins, polyvinyls, polycarbonates, polyacrylics, cellulose acetate, triacetate and proprionate, Teflon and Kelef polyfluoroethylenes and chloroethylenes, polyvinylalcohol, Fortrel, Encron, Dacron and Kodel polyesters, Spandex polyurethane, Acrilan, Creslan and Orlon acrylics, Caprolan polyamide, polystyrene, Styrofoam, Lucite and Plexiglass methylmethacrylates, Nomex polyamide, Vinyon polyvinyl, polyisobutylene, Bakelite phenol formaldehyde, urea formaldehyde resin.

Examples of natural polymers are:
cotton, linen, ramie, wool, silk, paper pulp cellulose, wood, proteins polypeptides, leather, hair, human skin, tissue hair and bone, waxes, petroleum fractions, coal coke, carbon.

Examples of inorganic polymers are:
Fiberglass, glass, ceramic, clay, kaolin, silicates, silica, alumina, marble, granite rock, soil, cement, human teeth.

Examples of metals are:
Iron, steel, stainless steel, copper, brass, bronze, nickel, chrome, gold, silver.

All the above can be in the form of filamens, fibers, yarns, films, woven fabrics, felts, powders, solid objects, resins, liquids, solutions, emulsions, suspension.

EXAMPLE 11

A piece of fiberglass glass fabric is heated, cleaned and placed in a solution A, containing:

2 g silver nitrate in 1000 cc water
for less than 1 second.

It is taken out, squeezed and placed in solution B, containing:

5 g sodium hydroxide in 1000 cc water at 160°F
also for less than 1 second.

A slight tan colored fabric results which can be dried and stored for future use.

EXAMPLE 12

The fabric from Example 1 is placed in solution C containing:

20 g ethylene imine monomer and
80 g isopropyl alcohol
for less than 1 second and then
2 g conc hydrochloric acid are added.

An exothermic reaction takes place with the grafting of ethylene imine on the glass fabric in less than 1 second.

The fabric is taken out, washed in hot water thoroughly and dried.

It is then dyed conventionally using Pontacyl Blue 5 R acid dye manufactured by DuPont. The fiberglass fabric accepts the dye readily to a deep shade, which is washfast and resistant to abrasion.

The electrostatic attraction of the negative acid dye to the positive ethylene imine is a proof of grafting.

EXAMPLE 13

A sample of polyvinyl chloride acetate film is treated first with the solutions of Example 11 then with the following solution:

5 g Sulfur trioxide (Sulfan, manufactured by Allied Chemical Corp.)
95 g Ethylene Dichloride, at room temperature for less than 1 second, then in a solution of:
Dimethylaminoethyl methacrylate at full concentration for less than 1 second.

A permanently dyeable film results when dyed withh the same Pentacyl Blue 5R dye.

In addition the grafted vinyl film exhibits excellent water adsorption as observed by a water drop test.

When a drop of water is deposited on the film and the film brought gradually to 90° the drop does not flow. The control, untreated film, sheds the water drop.

EXAMPLE 14

Similarly a sample of Polyvinylchloride film is grafted with sodium vinyl sulfonate. A negative charged graft is obtained in less than 1 second. It is dyed with Astrazon Blue B basic dye manufactured by Verona Dyestuffs.

EXAMPLE 15

A 30 g sample of polyisobutylene clear liquid resin is dissolved in 270 g heptane and treated with the following solution:

3 g chlorosulfonic acid
1 g tert butylhydroperoxide
5 g of acrylonitrile, mixed together and treated at 50°C for 2 hrs. The reaction is complete. The product is precipitated with acetone and dissolved in benzene. This procedure is repeated 3 times. The thus purified product is subjected to Kjeldahl analysis and shows a constant amount of nitrogen at 4%, or 15% of grafted acrylonitrile.

EXAMPLE 16

A sample of polyvinylchloride film is treated in a solution of:

5 g Sulfur trioxide
95 g Ethylene dichloride
for less than 1 second and washed in water.

Then as per Example 11 in silver nitrate solution and sodium hydroxide solution, for less than 1 second each.

It is then washed with water and placed in the following solution:

27 g dimethylaminoethyl methacrylate
60 g dimethylformamide
15 g glacial acetic acid
15 g benzyl chloride
45 cc water The solution with the film in it is brought to 160° – 180°F and the following catalysts added:

0.6 g t-butylhydroperoxide in 1 cc dimethylformamide and 0.2 g ammonium persulfate in 1 cc water After 2 minutes the reaction is completed, the film taken out and washed. It is now grafted with quaternary ammonium groups and possesses a strong positive charge as evidenced by the dyeability with acid dyes.

EXAMPLE 17

The same procedure is followed as Example 16 except that the monomer solution is prepared as follows:

40 g sodium vinylsulfonate
120 cc water
200 g dimethyl formamide
3 g glacial acetic acid
20 g glycidyl methacrylate
1.5 g ammonium persulfate in 3 cc water.

The film is placed in the solution and the solution maintained at 160°F for 2 minutes, washed in water and dried in air. A grafted film results which is permanently dyeable with basic dyes.

The following additional ionic graft materials can be used together with the silver graft initiator: Anhydrous aluminum chloride, stannic chloride, ferric chloride, titanium tetra chloride, phosphorus pentoxide, antimony pentachloride, fuming sulfuric acid, conc sulfuric acid, sodium methylate, sodium ethylate, sodium and potassium alcoholates, sodium metal dissolved in naphthalene.

Any soluble silver salt can be used, including silver nitrate, silver acetate, silver sulfate, silver carbonate and silver perchlorate.

The precipitation of the colloidal silver is preferably accomplished by means of alkali metal hydroxide such as sodium hydroxide, potassium hydroxide, lithium hydroxide or the like. The most preferred is of course sodium hydroxide because of its ready availability and economy.

The concentration of the silver salt in the aqueous solution can vary within wide ranges, though it is preferably between about 0.01% to 1%, and most preferably between about 0.05% to 0.1%.

The concentration of the alkali metal hydroxide in the aqueous solution can also vary within wide ranges though as a practical convenience it ranges generally between about 0.5% and 5% by weight.

What is claimed is:

1. Method of activating a polymeric material, which comprises subjecting a polymeric material the surface of which contains thereon a substance selected from the goup consisting of colloidal silver and silver oxide so that strongly ionic materials can be grafted onto said surface to the action of a sulfonating agent in a solvent medium hydrocarbon, whereby said polymeric material becomes rapidly sulfonated and easily subject to reaction with ionic materials including dyes.

2. Method according to claim 1 wherein said solvent medium is selected from the group consisting of hydrocarbons and chlorinated hydrocarbons.

3. Method according to claim 1 wherein said solvent medium is a chlorinated hydrocarbon.

4. Method according to claim 2 wherein said polymeric material is selected from the group consisting of polyolefins, polyesters and polyvinylchlorides.

5. Method according to claim 2 wherein said sulfonating agent is selected from the group consisting of sulfuric acid, chlorosulfonic acid, sulfurous acid, sulfur dioxide, sulfur trioxide, fuming sulfuric acid, sulfuryl chloride and pyrosulfuryl chloride.

6. Method according to claim 5 wherein said solvent medium is a chlorinated hydrocarbon selected from the group consisting of ethylene dichloride, methylene dichloride, triethylene chloride, carbon tetrachloride, methyl chloride, chlorobenzene and dichlorobenzene.

7. Method according to claim 6 wherein said polymeric material is selected from the group consisting of polyolefins, polyesters and polyvinylchloride.

8. Method according to claim 6 wherein said polymeric material is polypropylene.

* * * * *